US012609496B2

(12) United States Patent
Wu et al.

(10) Patent No.: US 12,609,496 B2
(45) Date of Patent: Apr. 21, 2026

(54) COMBINATION OF ELECTRICAL PLUG CONNECTOR AND MATCHING ELECTRICAL SOCKET CONNECTOR

(71) Applicant: ACES ELECTRONICS CO., LTD., Taoyuan (TW)

(72) Inventors: Chu-Cheng Wu, Taoyuan (TW); Kuo-Hua Huang, Taoyuan (TW)

(73) Assignee: ACES ELECTRONICS CO., LTD., Taoyuan (TW)

( * ) Notice: Subject to any disclaimer, the term of this patent is extended or adjusted under 35 U.S.C. 154(b) by 321 days.

(21) Appl. No.: 18/357,711

(22) Filed: Jul. 24, 2023

(65) Prior Publication Data

US 2024/0429666 A1 Dec. 26, 2024

(30) Foreign Application Priority Data

Jun. 26, 2023 (TW) ................................ 112123711

(51) Int. Cl.

| | |
|---|---|
| ***H01R 24/62*** | (2011.01) |
| ***H01R 12/70*** | (2011.01) |
| ***H01R 13/05*** | (2006.01) |
| ***H01R 13/11*** | (2006.01) |
| ***H01R 13/15*** | (2006.01) |
| ***H01R 13/405*** | (2006.01) |
| ***H01R 13/627*** | (2006.01) |

(52) U.S. Cl.

CPC ......... *H01R 24/62* (2013.01); *H01R 12/7011* (2013.01); *H01R 13/055* (2013.01); *H01R 13/11* (2013.01); *H01R 13/15* (2013.01); *H01R 13/405* (2013.01); *H01R 13/6271* (2013.01)

(58) Field of Classification Search

CPC ............................ H01R 12/7011; H01R 24/62
USPC .......................................................... 439/660
See application file for complete search history.

(56) References Cited

U.S. PATENT DOCUMENTS 11,233,359 B2 * 1/2022 Wang .................. H01R 13/502
2022/0021157 A1 * 1/2022 Sun ...................... H01R 13/631

FOREIGN PATENT DOCUMENTS

CN 213212457 U * 5/2021

* cited by examiner

*Primary Examiner* — Tho D Ta
*Assistant Examiner* — Thaslimur Rahman
(74) *Attorney, Agent, or Firm* — MUNCY, GEISSLER, OLDS & LOWE, P.C.

(57) ABSTRACT

A combination of electrical plug connector and matching electrical socket connector includes a plug connector, a sliding seat, a buckle assembly, a draw belt, and a socket connector. When the plug connector is docked with the socket connector, the supporting spring leaves of the buckle assembly support down to the holder base of the plug connector, so that the hook portions of the buckle assembly are hooked in the hook holes of the socket connector. When pressing the buckle assembly or pulling the draw belt, the supporting spring leaves are elastically deformed, and the hook portions are disengaged from the hook holes for separation between the plug connector and the socket connector. An insulating colloid is formed on the holder base to fix the circuit board of the plug connector, thereby firmly combining the plug connector with the holder base.

13 Claims, 10 Drawing Sheets

COMBINATION OF ELECTRICAL PLUG CONNECTOR AND MATCHING ELECTRICAL SOCKET CONNECTOR

This application claims the priority benefit of Taiwan patent application number 112123711, filed on Jun. 26, 2023.

BACKGROUND OF THE INVENTION

1. Field of the Invention

The present invention relates to electrical connector technology and more particularly, to a combination of electrical plug connector and matching electrical socket connector, wherein a buckle assembly and a housing are installed on a holder base of the plug connector, and an insulating colloid is formed in an accommodating space of the holder base to fix a circuit board in the holder base, and at the same time, the housing, the circuit board and wires are combined into a solid covering joint on the holder base, thereby preventing the contacts from peeling or shaking when plugging and unplugging, and achieving the effect of accurate electrical connection.

2. Description of the Related Art

Today's computer technology is growing at an ever-changing speed, and the development trend of computer is also moving towards the direction of powerful computing functions, fast speed and small size, so that the number of computer communication ports is also reduced accordingly. This kind of communication connection port may also be used on other equipment with the same specification, such as car audio, car computer, charging device, satellite navigation, communication device, etc. However, in addition to sockets, the communication connection ports in these devices are cable plugs that combine cables with plugs. Therefore, the future development of this type of cable plug is also rising. However, the size of this kind of cable plug is getting smaller and smaller. In terms of the overall structural configuration, it is important how to use a good structural design so that the cable plug does not directly pull the cable when it is plugged in and out, and also avoids the situation that the cable plug and socket connector are too small and easy to be damaged. In addition, without any supporting or fixing structure for the plug, it is easy to cause the cable plug to be pulled and fall off after being inserted into the socket, thereby affecting the transmission of signals. Therefore, in the above detailed description, it can be found that in the design of the cable plug, the main consideration can be to ensure the stability of the cable plug when it is docked with the socket connector. In addition, it should be noted that the plug is exposed when it is connected with the cable. During use, it should be avoided to pull the wire to make the plug come off. Therefore, in view of the lack of the above-mentioned conventional designs, it is necessary to further research and development by the relevant industry to improve the deficiencies and deficiencies of the conventional designs.

SUMMARY OF THE INVENTION

Therefore, in view of the above-mentioned problems and deficiencies, the inventor collected relevant information, and after various evaluations and considerations, he designed this combination of electrical plug connector and matching electrical socket connector.

It is therefore the main object of the present invention to provide a combination of electrical plug connector and matching electrical socket connector, which comprises an electrical plug connector assembly comprising a plug connector, a sliding seat, a draw belt and a buckle assembly, and an electrical socket connector. The plug connector comprises a circuit board with a docking terminal set, a holder base and a housing. The holder base comprises an accommodating space for accommodating the circuit board, a docking portion bilaterally extended from a front side thereof and a mounting surface formed on the top surface thereof at a rear side relative to the docking portion. The housing comprises a locating space for accommodating and positioning the holder base, and two perforations bilaterally provided on an upper surface thereof. The sliding seat is combined with the draw belt, comprising a seat body installed on the mounting surface in a position-limiting sliding manner, and two elastic portions of continuous turning S-shaped elastic pieces integrally and bilaterally formed on the rear side of the seat body. The buckle assembly is pivotally connected to the holder base, comprising a pressing surface located on the mounting surface and behind the seat body of the sliding seat, two support arms respectively extended from two opposite lateral sides of the pressing surface in the same direction, a hook portion protruding upwards from the suspending front end of each support arm and two supporting spring leaves supported on the holder base. When the pressing surface is pressed, the supporting spring leaves are elastically deformed and the hook portions of the two support arms are shifted downward by a distance at the perforations. When the draw belt is pulled, it pulls the sliding seat to make the elastic portions elastically deform and also link the hook portions of the two support arms to elastically deflect downward at the perforations. The rear of the accommodating space of the holder base is integrally formed with an insulating colloid for the circuit board to be fixed in the holder base, and at the same time, the housing, the circuit board and the wires welded to the circuit board are combined firmly tother and packaged on the holder base. When plugging and unplugging the thin and small electrical plug connector assembly, the insulating colloid integrally formed by the plug connector is used to prevent the housing, the circuit board or the wires from peeling or shaking, thereby achieving accurate electrical connection of the plug connector and preventing damage.

It is another object of the present invention to provide a combination of electrical plug connector and matching electrical socket connector, which comprises an electrical plug connector assembly comprising a plug connector, a sliding seat, a draw belt and a buckle assembly, and an electrical socket connector. The plug connector comprises a circuit board with a docking terminal set, a holder base and a housing. The holder base comprises an accommodating space for accommodating the circuit board, a docking portion bilaterally extended from a front side thereof and a mounting surface formed on the top surface thereof at a rear side relative to the docking portion. The housing houses the holder base, comprising two perforations bilaterally provided on an upper surface thereof. The sliding seat is combined with the draw belt, comprising a seat body installed on the mounting surface in a position-limiting sliding manner, and two continuous turning elastic portions integrally and bilaterally formed on the rear side of the seat body. The buckle assembly is pivotally connected to the holder base, comprising a pressing surface located on the mounting surface and behind the seat body of the sliding seat, two support arms respectively extended from two opposite lateral sides of the pressing surface in the same direction, a hook portion protruding upwards from the suspending front end of each support arm and two supporting spring leaves supported on the holder base. When the docking portion of the plug connector of the present invention is inserted into the socket portion of the electrical socket connector to form an electrical connection, the two supporting spring leaves are supported downward against the limiting portions, and the hook portions on the two support arms are held in an upward elastic pre-force state and snapped into the hook holes to form a positioning. When pressing the pressing surface to unlock, the supporting spring leaves are elastically deformed and the hook portions of the two support arms are shifted downward by a distance at the perforations. When the draw belt is pulled, it pulls the sliding seat to make the elastic portions elastically deform and also link the hook portions of the two support arms to elastically deflect downward at the perforations. At this time, the two hook portions are separated from the hook holes on the socket portion of the electrical socket connector, and descend into the perforations of the housing, so that the plug connector can be easily separated from the electrical connection of the electrical socket connector. When the draw belt is pulled, it pulls the sliding seat to make the elastic portions elastically deform and also link the hook portions of the two support arms to elastically deflect downward at the perforations and disengage from the hook holes. The rear of the accommodating space of the holder base is integrally formed with an insulating colloid for the circuit board to be fixed in the holder base, and at the same time, the housing, the circuit board and the wires welded to the circuit board are combined firmly together and packaged on the holder base. When plugging and unplugging the thin and small electrical plug connector assembly, the insulating colloid prevents the housing, the circuit board or the wires from peeling or shaking, thereby achieving accurate electrical connection of the plug connector and preventing damage.

DETAILED DESCRIPTION OF THE PREFERRED EMBODIMENT

Figure 1:
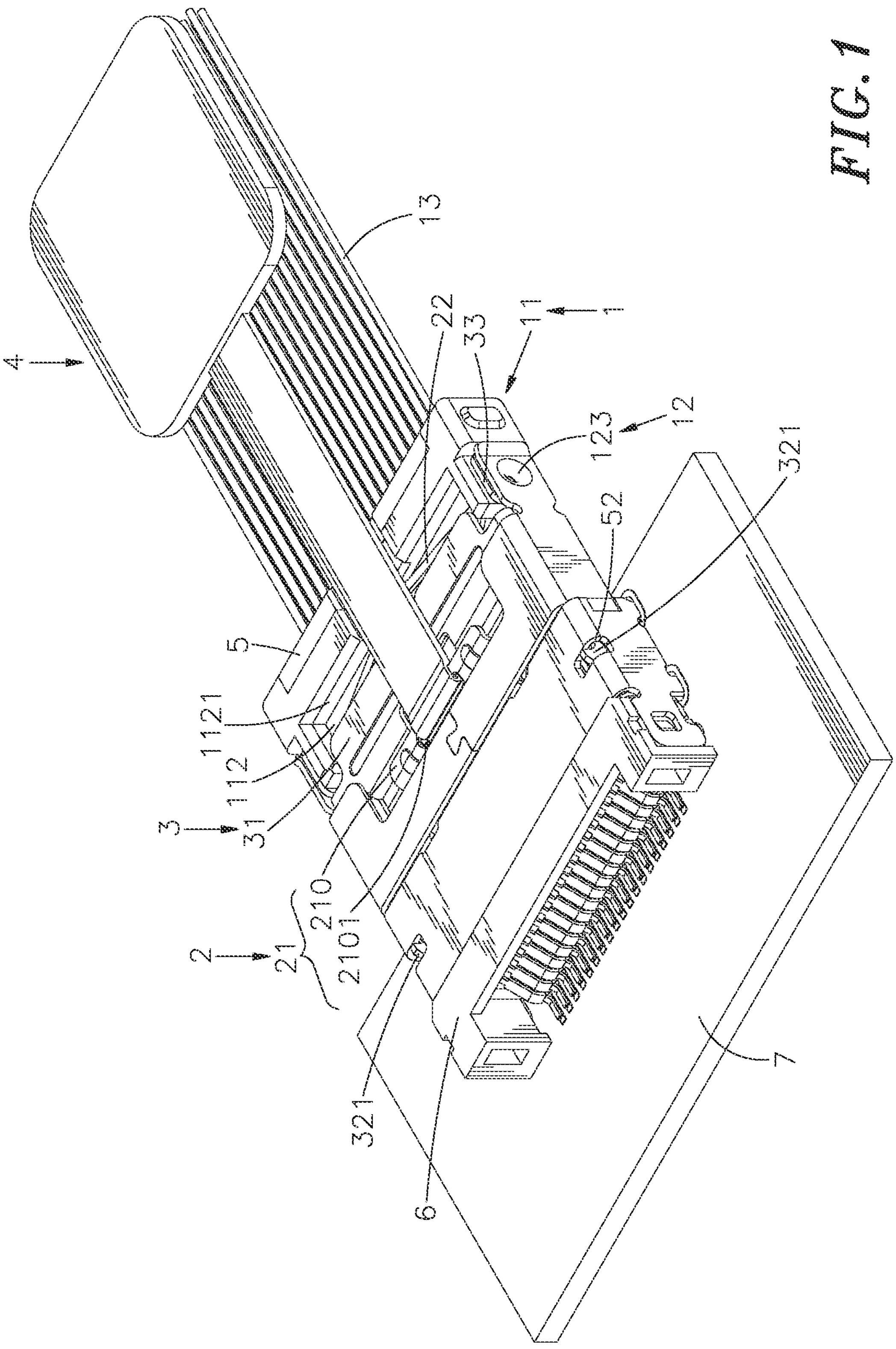
FIG. 1 is a three-dimensional appearance diagram of the present invention.

In order to achieve the above-mentioned purpose and effect, the features and functions of the technical means and structure adopted by the present invention are hereby drawn to describe in detail by way of a preferred embodiment as follows, so as to facilitate a complete understanding of the present invention.

Please refer to FIGS. 1-10. As shown in the figures, it can be clearly seen that the combination of electrical plug connector and matching electrical socket connector of the present invention comprises an electrical plug connector assembly comprising a plug connector 1, a sliding seat 2, a buckle assembly 3 and a draw belt 4, and an electrical socket connector 6.

The plug connector 1 comprises a circuit board 10, a holder base 11 and a housing 12. The circuit board 10 comprises a docking terminal set 101 located on opposing top and bottom surfaces of the front side thereof, a contact set 102 located on opposing top and bottom surfaces of the opposing rear side thereof for the welding of wires 13, and two convex portions 103 respectively protruded from two opposite lateral sides thereof. The holder base 11 comprises an accommodating space 110 for accommodating the circuit board 10, two stoppers 1101 bilaterally provided in the accommodating space 110 for limiting the convex portions 103 of the circuit board 10 to keep the docking terminal set 101 of the circuit board 10 outside of the holder base 11 during assembly, a docking portion 111 bilaterally extended from a front side thereof and suspending at two opposite lateral sides of the docking terminal set 101, a mounting surface 112 and a stopping portion 1121 sequentially formed on a top surface thereof at a rear side relative to the docking portion 111, two positioning structures 113 respectively formed on two opposite lateral sides of the mounting surface 112, and at least one engaging portion 114 provided on a bottom surface thereof. Each positioning structure 113 is sequentially provided with a limiting portion 1131, a convex rail 1132 and a pivoting portion 1133 from the docking portion 111 toward an opposing rear side of the holder base 11. The housing 12 comprises a locating space 120 formed in the center thereof for accommodating and positioning the holder base 11, two concave limiting grooves 121 respectively formed on two sides of the locating space 120, a perforation 122 respectively provided on an upper surface of each of the limiting grooves 121, two limiting shaft portions 123 respectively provided on two opposite sidewalls thereof, at least one engaging hole 124 located on a bottom surface thereof for the engagement of the at least one engaging portion 114 when the holder base 11 is assembled, and at least one fixing hole 125 located on a rear side relative to the at least one engaging hole 124.

The sliding seat 2 comprises a seat body 21 coupled with the positioning structures 113 and installed on the mounting surface 112 in a position-limiting sliding manner, and two elastic portions 22 of continuous turning S-shaped elastic pieces integrally and bilaterally formed on a rear side of the seat body 21. The seat body 21 comprises a moving portion 210, a through hole 2101 located on the moving portion 210 for the mounting of the draw belt 4, two rail panels 211 perpendicularly extended from two opposite lateral sides thereof, and a rail hole 2110 located on each of the rail panels 211 and coupled to one respective convex rail 1132.

The buckle assembly 3 is pivotally positioned on the positioning structures 113, comprising a pressing surface 31 placed on the mounting surface 112 and movable by the moving portion 210 of the seat body 21 of the sliding seat 2, a notch 310 slightly larger than the draw belt 4 and located on a front side of the pressing surface 31, two support arms 32 respectively extended from two opposite lateral sides of the pressing surface 31 in the same direction, a hook portion 321 protruding upwards from a suspending front end of each support arm 32, two supporting spring leaves 322 respectively suspending below the hook portions 321 and the support arms 32 to support up the support arms 32 to maintain a vertically upward elastic preload, and two rotating portions 33 respectively formed on opposing rear ends of the two support arms 32 outside the pressing surface 31 and respectively coupled to the pivoting portions 1133.

Furthermore, when assembling the present invention, the draw belt 4 is wound and fixed on the through hole 2101 of the sliding seat 2 first, then place the seat body 21 of the sliding seat 2 on the mounting surface 112 of the holder base 11. At the same time, the rail holes 2110 of the rail panels 211 on both sides of the seat body 21 are respectively and limitedly fitted on the convex rails 1132 to form a positioning, and the suspending ends of the elastic portions 22 integrally and bilaterally formed on the rear side of the seat body 21 are abutted against the stopping portion 1121 of the mounting surface 112. Then place the pressing surface 31 of the buckle assembly 3 on the mounting surface 112 and behind the seat body 21 of the sliding seat 2 to pivotally position the rotating portions 33 of the buckle assembly 3 between the pivoting portions 1133 of the positioning structures 113 and the limiting shaft portions 123 of the housing 12, and to install the hook portions 321 and the supporting spring leaves 322 of the buckle assembly 3 at the respective limiting portions 1131. Then put the locating space 120 in the center of the housing 12 onto the docking portion 111 until the docking portion 111 is set in the relatively concave limiting grooves 121, so that the limiting shaft portions 123 are put into the rotating portions 33 and fitted on the pivoting portions 1133 to form a positioning, and each engaging portion 114 of the holder base 11 passes through one respective engaging hole 124 of the housing 12 in a snap-in position, and at the same time, the two hook portions 321 are located at the limiting portions 1131 of the positioning structures 113 and pass through the perforations 122 at the top of the housing 12. At this time, the supporting spring leaves 322 are supported downward against the limiting portions 1131 to force the two hook portions 321 on the two support arms 32 into an upward elastic pre-stressed state, to form the pre-formed state of the combination of the holder base 11, the sliding seat 2, the buckle assembly 3 and the housing 12. And the contact set 102 of circuit board 10 is welded with wires 13. Then push the docking terminal set 101 of the circuit board 10 toward the rear side of the accommodating space 110 of the holder base 11, and the docking terminal set 101 of the circuit board protrudes from the docking portion 111 of the holder base 11 to form a positioning. At this time, an insulating colloid 5 is integrally formed behind the accommodating space 110 of the holder base 11, so that the contact set 102 of the circuit board 10 and the wires 13 located at the contact set 102 are covered with the insulating colloid 5 for the circuit board 10 to be firmly fixed in the accommodating space 110 of the holder base 11. The insulating colloid 5 is combined at the at least one fixing hole 125 of the housing 12 after molding. In this way, the housing 12 and the circuit board 10 welded with the wires 13 are combined with each other through the insulating colloid 5 to form a firm covering joint on the holder base 11, and the overall structure of the electrical plug connector assembly of the present invention can be completed.

Please continue to refer to FIGS. 1 to 4. It can be clearly seen from the figures that the electrical socket connector 6 is soldered on a circuit board 7. The electrical socket connector 6 comprises a socket portion 61, and two hook holes 62 bilaterally located on a top surface of the socket portion 61 for the hook portions 321 on the two support arms 32 to be snapped into position.

Figure 2:
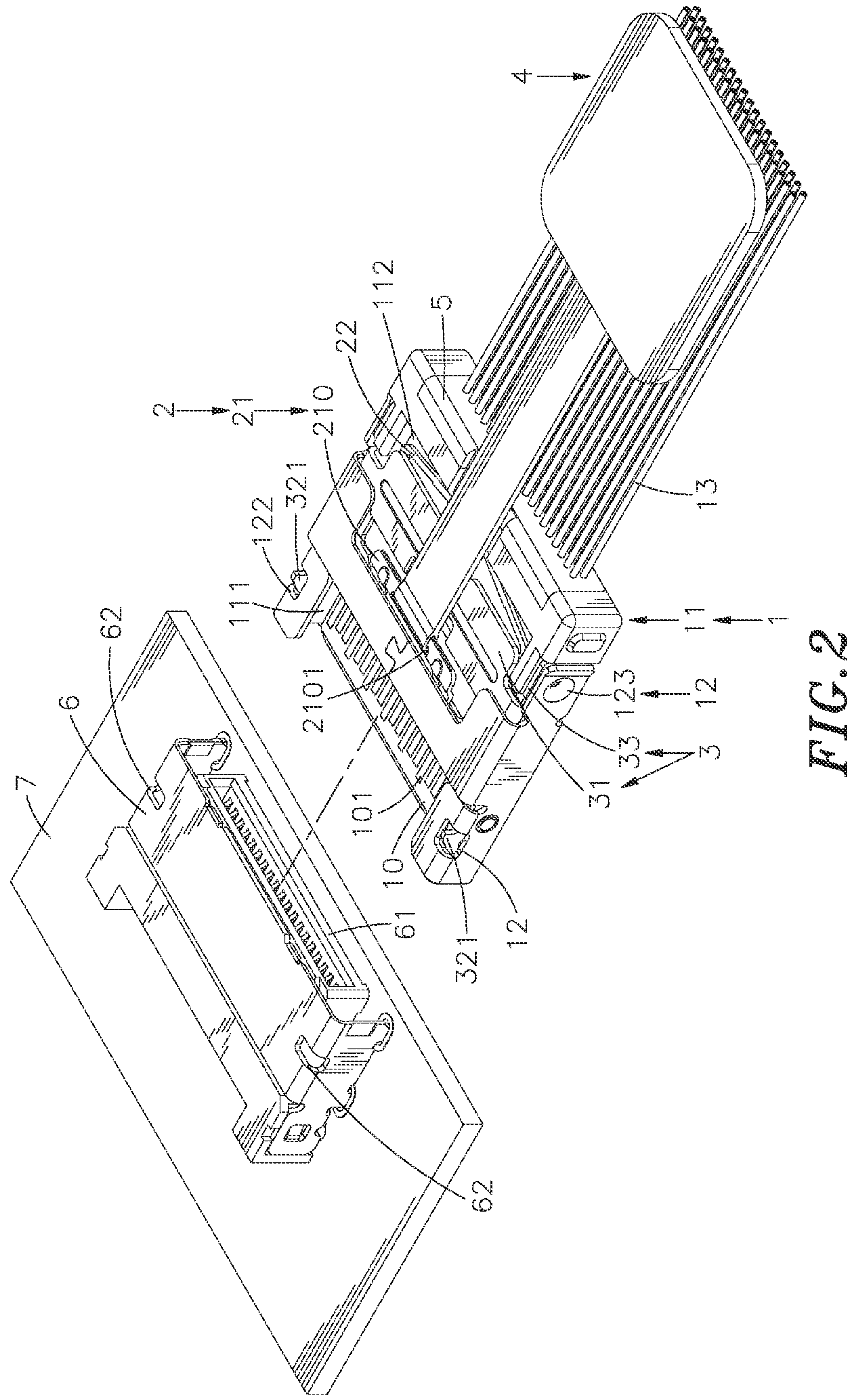
FIG. 2 is a three-dimensional appearance view of the electrical plug connector and the matching electrical socket connector of the present invention before docking.
Figure 10:
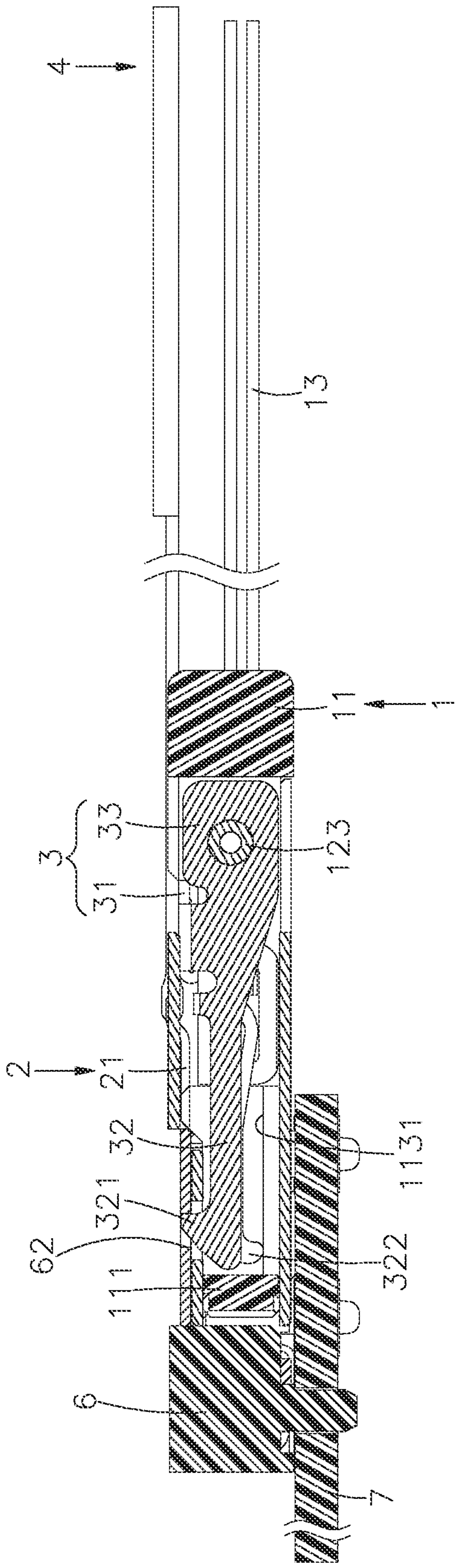
FIG. 10 is a side sectional view of the hook portion of the molded buckle assembly of the present invention.

Please refer to FIGS. 2 and 10. It can be clearly seen from the figures that when the present invention is locked, the docking portion 111 of the plug connector of the present invention is first inserted into the socket portion 61 of the electrical socket connector 6 to form an electrical connection. At this time, the two supporting spring leaves 322 are supported downward against the limiting portions 1131, and the hook portions 321 on the two supporting arms 32 are held in an upward elastic pre-forced state and snapped into the respective hook holes 62 to form a positioning.

Please refer to FIG. 10 again. It can be clearly seen from the figure that the present invention has two unlocking methods. The first unlocking method is to press the pressing surface 31 of the buckle assembly 3, that is, the rotating portions 33 can be used as the axis point to make the supporting spring leaves 322 support downward against the limiting portion 1131 to elastically deform, and the pressing surface 31, two support arms 32 and hook portions 321 of the buckle assembly 3 are flexibly shifted downward by a distance in the space of the mounting surface 112. At this time, the two hook portions 321 are separated from the hook holes 62 on the socket portion 61 of the electrical socket connector 6 and descend to the perforations 122 of the housing 12, so that the electrical plug connector assembly can be easily separated from the electrical connection of the electrical socket connector 6. The second unlocking method is to pull the draw belt 4 at the through hole 2101 to cause the elastic portions 22 of the sliding seat 2 to be squeezed and elastically deformed at the mounting surface 112 and to make the moving portion 210 push the pressing surface 31 so that the two support arms 32 and the hook portions 321 elastically offset a distance downward in the space of the mounting surface 112, and the two hook portions 321 can be separated from the hook holes 62 on the socket portion 61 of the electrical socket connector 6 and descend to the perforations 122 of the housing 12. This method also allows the electrical plug connector assembly to be easily separated from the electrical connection of the electrical socket connector 6. When withdrawing the electrical plug connector assembly from the electrical socket connector 6, the insulating colloid 5 that combines the housing 12, the holder base 11 and the circuit board 10 welded with wires 13 into a stable state can prevent the housing 12, the circuit board 10 or the wires 13 from separating from the holder base 11 of the plug connector 1 in the direction of exit, resulting in poor contact and connection failure.

Figure 3:
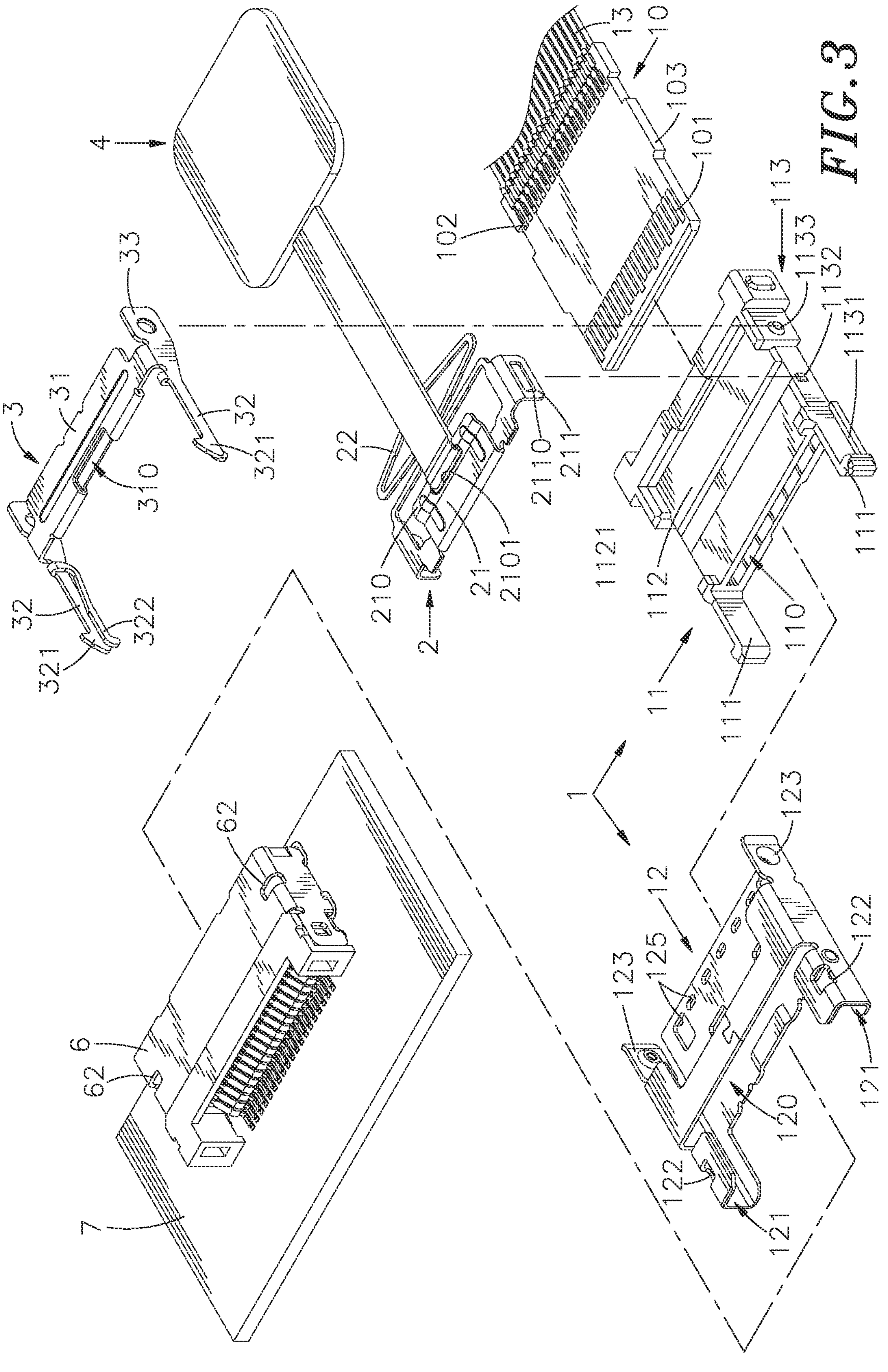
FIG. 3 is a three-dimensional exploded view of the present invention.
Figure 4:
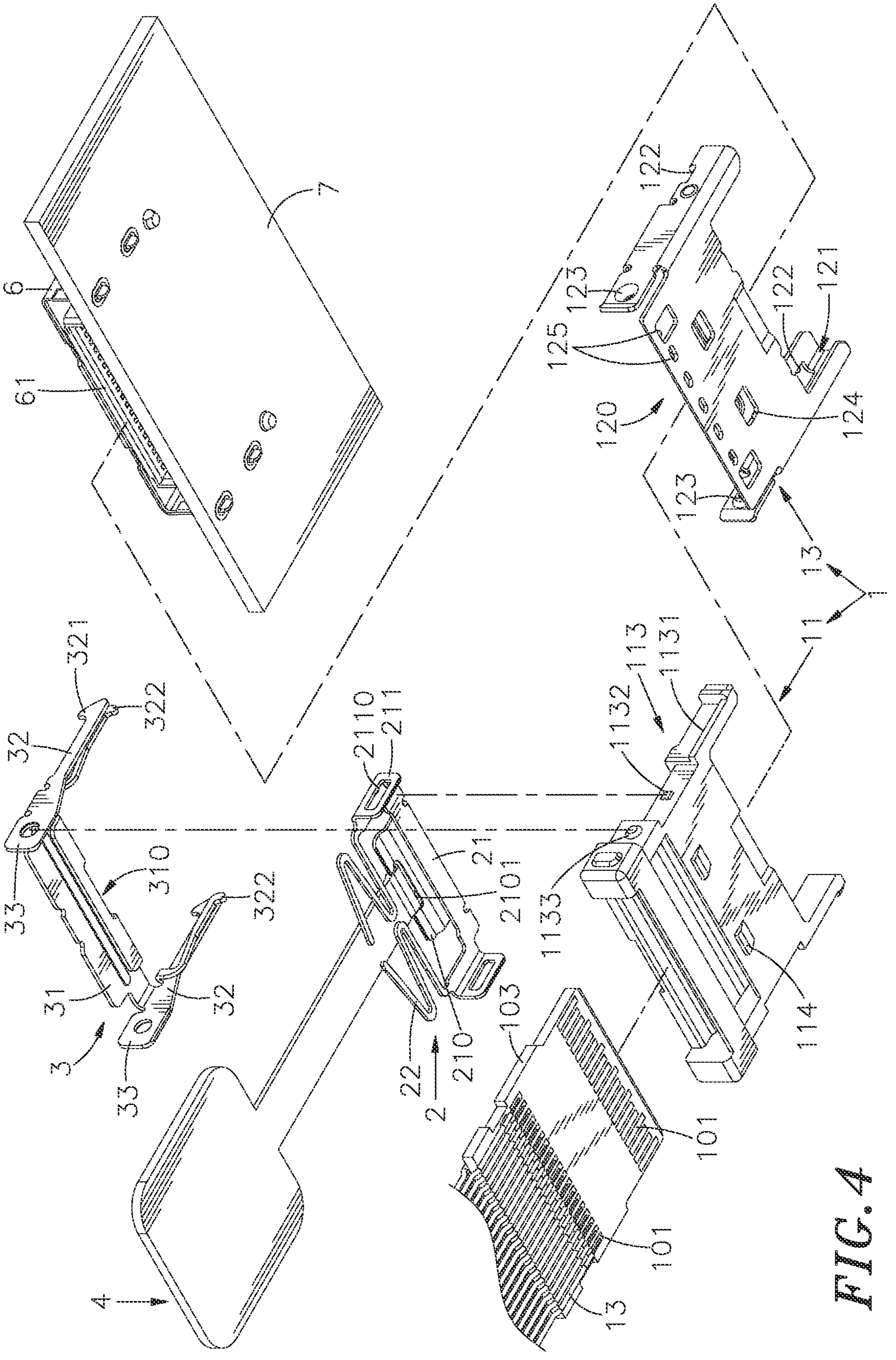
FIG. 4 is a three-dimensional exploded view of another perspective of the present invention.
Figure 5:
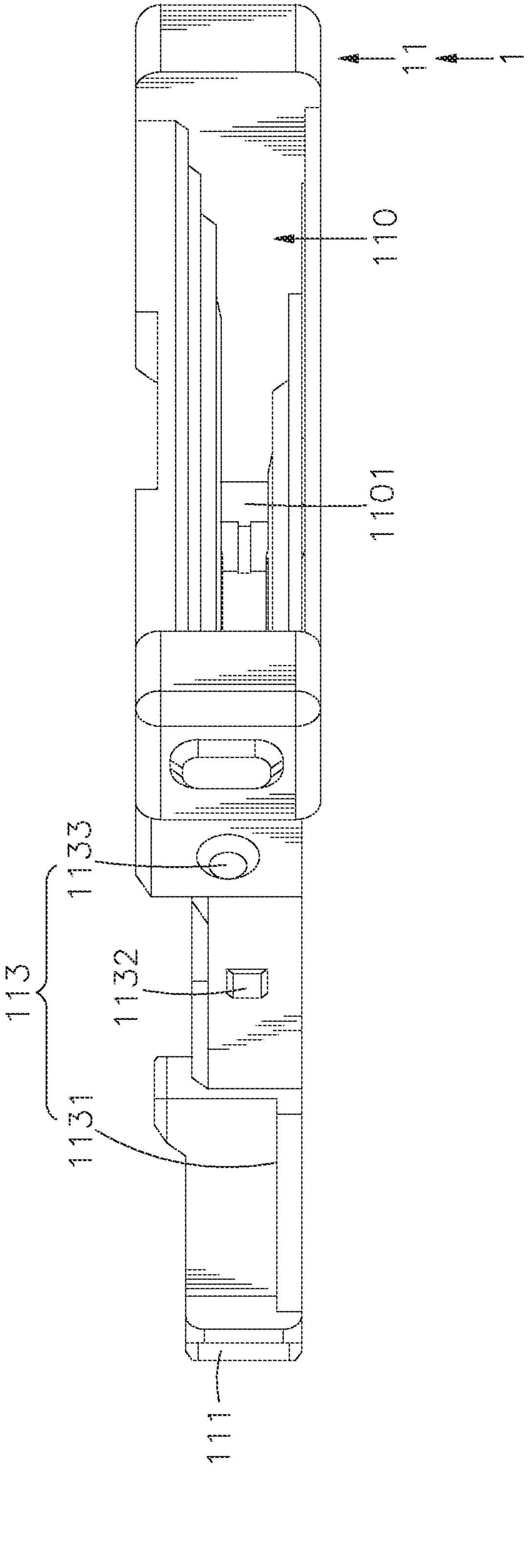
FIG. 5 is a three-dimensional appearance diagram of the holder base of the present invention.
Figure 6:
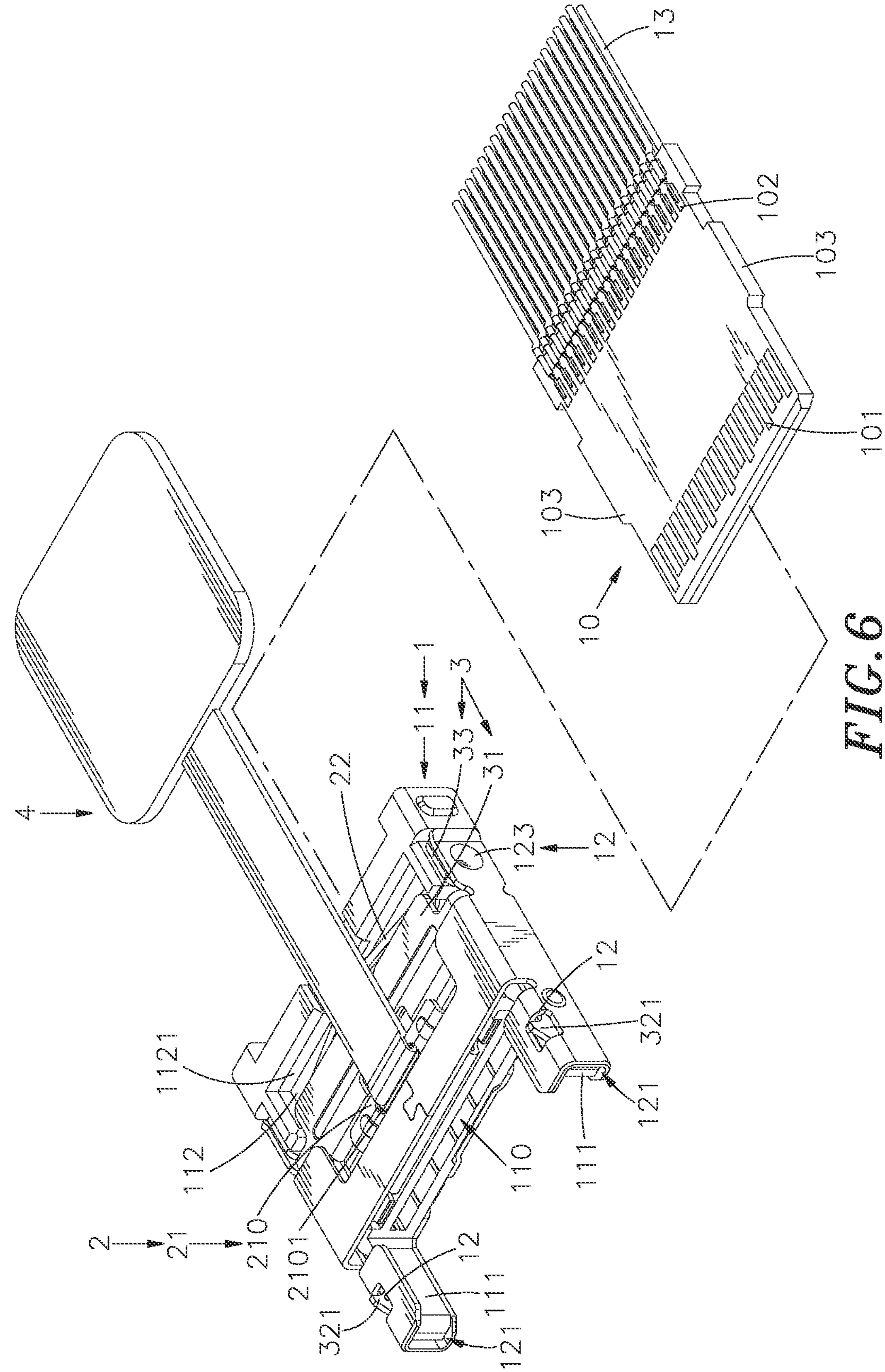
FIG. 6 is a three-dimensional appearance view of the holder base and circuit board of the plug connector of the present invention before molding.
Figure 7:
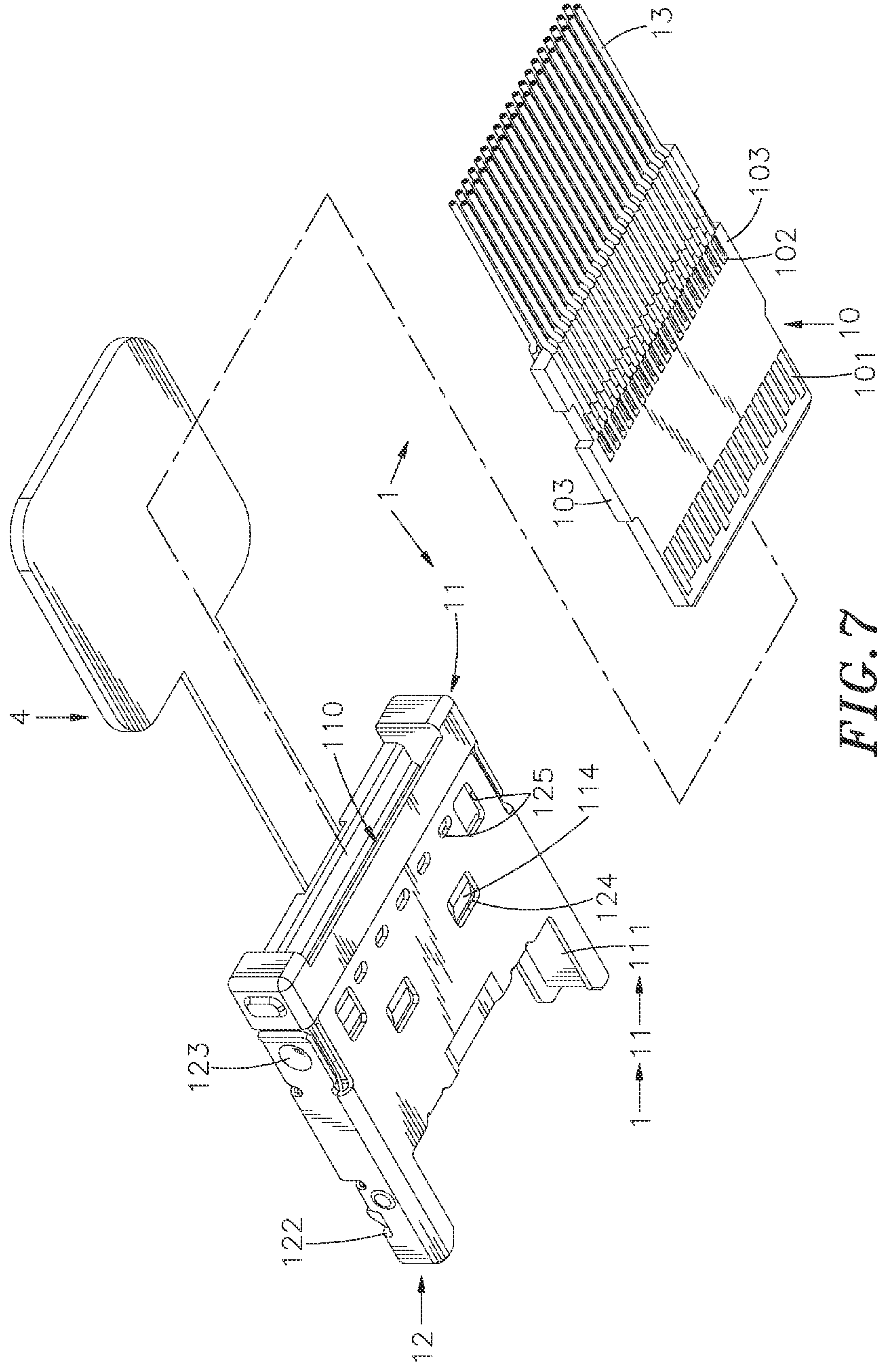
FIG. 7 is a three-dimensional appearance view of the holder base and circuit board before molding of the plug connector of the present invention from another perspective.
Figure 8:
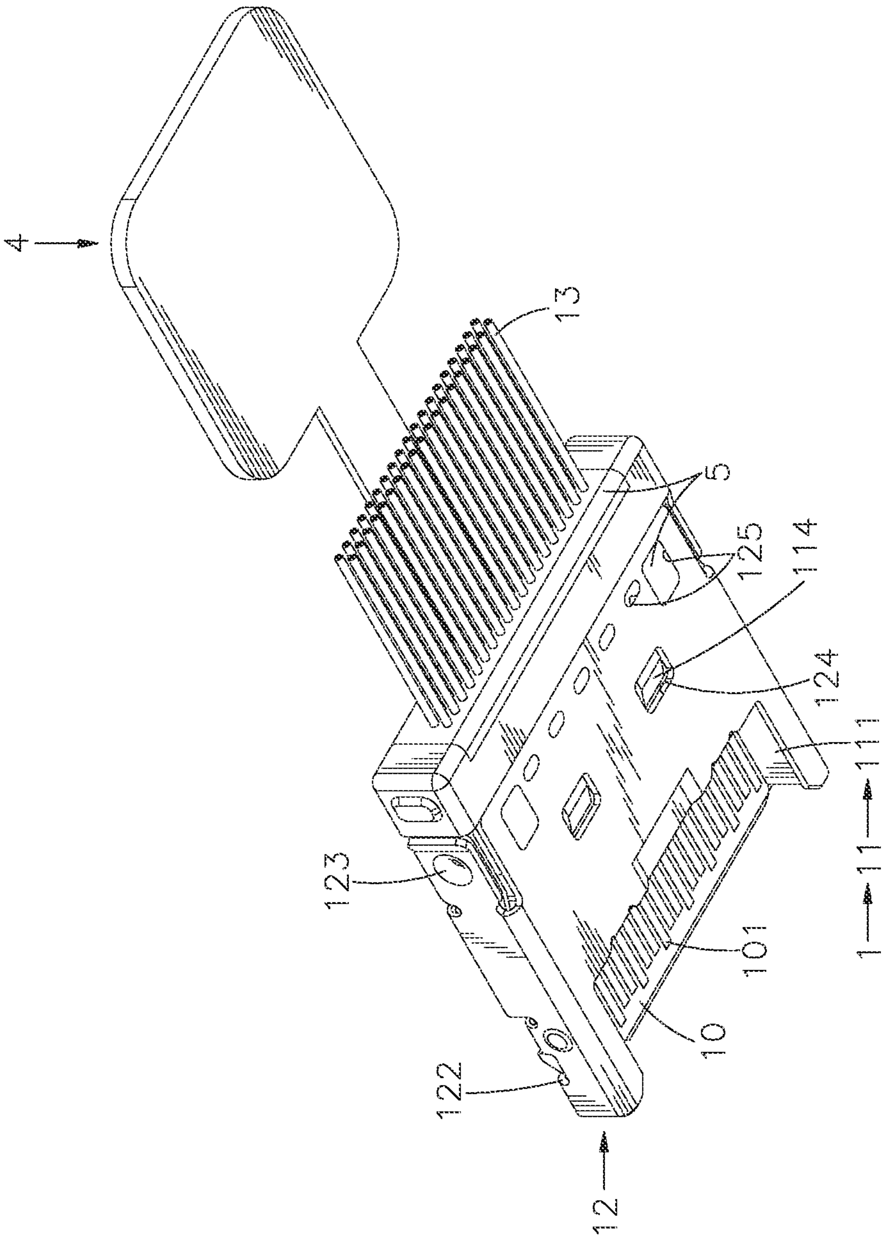
FIG. 8 is the three-dimensional appearance view of the holder base and circuit board of the plug connector of the present invention after molding.
Figure 9:
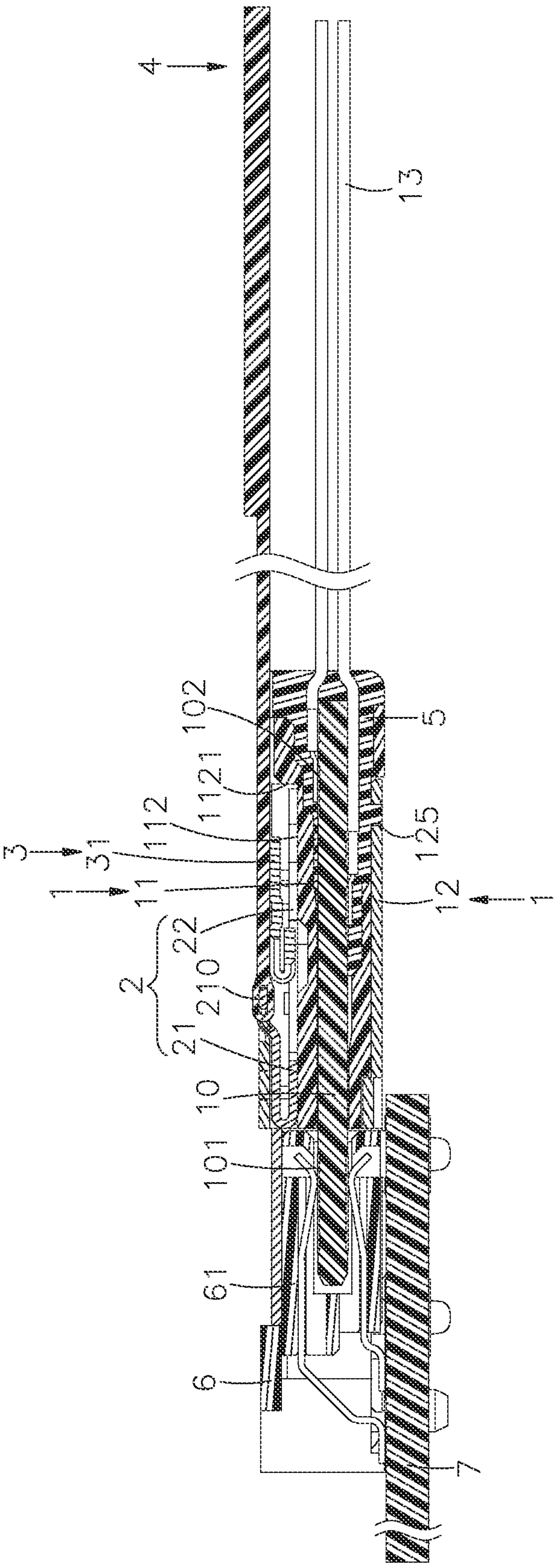
FIG. 9 is a side sectional view of the present invention after molding.

Please refer to FIGS. 3, 4 and 10. It can be clearly seen from the figures that the two support arms 32 are respectively extended from the two opposite lateral sides of the pressing surface 31 in the same direction, and the two supporting spring leaves 322 are respectively suspending below the hook portions 321 and the support arms 32 to support up the support arms 32. In this way, the two support arms 32 are aligned and spaced up and down between the hook portions 321 and the supporting spring leaves 322, so that when the two supporting spring leaves 322 elastically support downward against the limiting portions 1131, the hook portions 321 on the two support arms 32 above the two supporting spring leaves 322 are stable to maintain a vertically upward elastic preload. However, the two supporting spring leaves 322 only need to have the hook portions 321 on the two supporting arms 32 to maintain the vertically upward elastic preload when the pressing surface 31 is not pressed or the draw belt 4 is not pulled. The simple and equal changes and modifications of the positions of the two supporting spring leaves 322 do not limit the protection scope of the present invention, and are hereby stated.

In addition, in the preferred embodiment of the present invention, the elastic portions 22 of continuous turning S-shaped elastic pieces are integrally and bilaterally formed on the rear side of the seat body 21 of the sliding seat 2, respectively. However, the number of elastic portion 22 can be set at least one, so that the sliding seat 2 can form a sliding state on the holder base 11 through the at least one elastic portion 22 with telescopic displacement. The S-shaped elastic piece forming the elastic portion 22 can be formed in a "Z" shape or an "8" shape. The elastic portion 22 can also be formed by extending the elastic piece in the sliding seat 2. Therefore, the elastic portion 22 only needs to have a shape with elastic demolding and reset functions. Such simple and equal changes and modifications do not limit the protection scope of the present invention, and are hereby stated.

In addition, in this embodiment, the center of the docking portion 111 of the plug connector 1 accommodates the circuit board 10 with the docking terminal set 101, so that the docking terminal set 101 can be used as an electrical connection with the electrical socket connector 6. Therefore, the docking terminal set 101 of the circuit board 10 of the plug connector 1 is not necessarily designed in the form of a circuit board, but can also be designed in the form of other plural terminals or conductive strips to form a cable combined plug or any cable connector for socket connector use. Such simple equal changes and modifications do not limit the protection scope of the present invention, and such simple equal changes and modifications should still be included in the patent scope covered by the present invention.

In addition, in this embodiment, the rotating portions 33 of the buckle assembly 3 of the plug connector 1 are combined with the pivoting portions 1133 of the holder base 11, and then the housing 12 is assembled on the holder base 11, and the limiting shaft portions 123 of the housing 12 are assembled at the pivoting portions 1133 so that the buckle assembly 3 forms an axial limit and pivots in a swinging state with the pivoting portions 1133 as the axis. The buckle assembly 3 can also be independently assembled on the pivoting portions 1133 of the holder base 11 or on the limiting shaft portions 123 of the housing 12 in a swinging state. Such simple equal changes and modifications do not limit the protection scope of the present invention, and such simple equal changes and modifications should still be included in the patent scope covered by the present invention.

In addition, the present invention mainly aims at the feature that pressing the pressing surface 31 enables the supporting spring leaves 322 to be elastically deformed to move the hook portions 321 on the two support arms 32 downward by a distance, the feature that when the draw belt 4 pulls the sliding seat 2 to elastically deform the elastic portions 22, the hook portions 321 of the two support arms 32 are elastically deflected downward, and the feature that the insulating colloid 5 is integrally formed behind the accommodating space 110 of the holder base 11 to fix the circuit board 10 in the holder base 11, and at the same time, to combine the housing 12, the circuit board 10 and the wires 13 into a solid covering joint on the holder base 11. In this way, the electrical plug connector assembly can be firmly connected to the matching electrical socket connector 6 and the action can be confirmed. When plugging and unplugging the thin and small electrical plug connector assembly, the insulating colloid 5 integrally formed by the plug connector is used to prevent the housing 12, the circuit board 10 or the wires 13 from peeling or shaking, thereby achieving accurate electrical connection of the plug connector and preventing damage.

However, the above detailed description is only for the description of a preferred feasible embodiment of the present invention, but this embodiment is not used to limit the scope of the patent application of the present invention. All other equivalent changes and modifications completed without departing from the technical spirit disclosed in the present invention shall be included in the patent scope covered by the present invention.

To sum up, the combination of electrical plug connector and matching electrical socket connector of the present invention has a significant effect improvement when used, and it is in line with the requirements for the application of the invention patent. I filed an application in accordance with the law, and hope that the review committee will approve this case as soon as possible to protect the hard work of the inventor. If you have any doubts, please feel free to write to us, the inventor will do his best to cooperate, thank you very much.

What the invention claimed is:

1. A combination of electrical plug connector and matching electrical socket connector, comprising an electrical plug connector assembly comprising a plug connector and a buckle assembly, and an electrical socket connector, wherein:

said plug connector comprising a circuit board, a holder base and a housing, said holder base comprising an accommodating space for accommodating said circuit board, a docking portion bilaterally extended from a front side thereof and a mounting surface formed on a top surface thereof at a rear side relative to said docking portion, said housing comprising a locating space for accommodating and positioning said holder base and two perforations bilaterally provided on an upper surface thereof, said buckle assembly is pivotally positioned between said holder base and said housing, said buckle assembly comprising a pressing surface placed on said mounting surface, two support arms respectively extended from two opposite lateral sides of said pressing surface in the same direction, a hook portion protruding upwards from a suspending front end of each said support arm and two supporting spring leaves supported on said holder base in such a manner that when said pressing surface is pressed, said supporting spring leaves are elastically deformed and said hook portions of said two support arms are shifted downward by a distance at said perforations, wherein, said holder base further comprises two positioning structures respectively formed on two opposite lateral sides of said mounting surface for pivotal positioning of said buckle assembly, and each said positioning structure of said holder base comprises a pivoting portion; said buckle assembly further comprises two rotating portions respectively formed on opposing rear ends of said two support arms outside said pressing surface and respectively coupled to said pivoting portions of said positioning structures of said holder base of said plug connector;

said electrical socket connector comprising a socket portion for said docking portion of said plug connector to be docked to form an electrical connection, and two hook holes bilaterally located on a top surface of said socket portion for said hook portions on said two support arms to be snapped into position.

2. The combination of electrical plug connector and matching electrical socket connector as claimed in claim 1, wherein said circuit board comprises a docking terminal set located on opposing top and bottom surfaces of a front side thereof, and a contact set located on opposing top and bottom surfaces of an opposing rear side thereof for welding of preset wires.

3. The combination of electrical plug connector and matching electrical socket connector as claimed in claim 1, wherein said circuit board comprises two convex portions respectively protruded from two opposite lateral sides thereof; said holder base further comprises two stoppers bilaterally provided in said accommodating space for limiting said convex portions of said circuit board during assembly.

4. The combination of electrical plug connector and matching electrical socket connector as claimed in claim 1, wherein said housing comprises two limiting shaft portions respectively provided on two opposite sidewalls thereof.

5. The combination of electrical plug connector and matching electrical socket connector as claimed in claim 1, wherein said holder base further comprises at least one engaging portion provided on a bottom surface thereof; said housing further comprises at least one engaging hole located on a bottom surface thereof for the engagement of said at least one engaging portion when said holder base is assembled.

6. The combination of electrical plug connector and matching electrical socket connector as claimed in claim 1, wherein said housing further comprises at least one fixing hole located on a rear bottom side thereof; said plug connector further comprises an insulating colloid formed in said accommodating space of said holder base to combine said holder base, said circuit board and said fixing hole of said housing.

7. The combination of electrical plug connector and matching electrical socket connector as claimed in claim 1, wherein said two supporting spring leaves are respectively extended from a bottom side of said pressing surface below said hook portions and said support arms to support up said support arms to maintain a vertically upward elastic preload.

8. The combination of electrical plug connector and matching electrical socket connector as claimed in claim 7, wherein each said positioning structure of said holder base comprises a limiting portion for one respective said supporting spring leaf to be supported.

9. The combination of electrical plug connector and matching electrical socket connector as claimed in claim 1, wherein said holder base further comprises a sliding seat and a draw belt, said sliding seat comprising a seat body installed on said mounting surface in a position-limiting sliding manner, and two elastic portions bilaterally formed on a rear side of said seat body, said draw belt being combined on said sliding seat in such a manner that pulling said draw belt forces said sliding seat to elastically deform said elastic portions so that said seat body pushes said pressing surface to link said hook portions on said two support arms to elastically deflect downward at said perforations of said housing.

10. The combination of electrical plug connector and matching electrical socket connector as claimed in claim 9, wherein said holder base further comprises a stopping portion formed on said mounting surface for said elastic portions on the rear sides of said seat body of said sliding seat to resist.

11. The combination of electrical plug connector and matching electrical socket connector as claimed in claim 9, wherein said seat body of said sliding seat comprises a moving portion, and a through hole located on said moving portion for mounting of said draw belt.

12. The combination of electrical plug connector and matching electrical socket connector as claimed in claim 9, wherein said holder base comprises two convex rails respectively formed on two opposite lateral sides of said mounting surface; said seat body of said sliding seat further comprises two rail panels perpendicularly extended from two opposite lateral sides thereof, and a rail hole located on each of said rail panels and coupled to one respective said convex rail.

13. The combination of electrical plug connector and matching electrical socket connector as claimed in claim 9, wherein each said elastic portion of said sliding seat is a continuous turning S-shaped elastic piece.

* * * * *